United States Patent
Harrington, Jr.

(10) Patent No.: US 9,506,617 B2
(45) Date of Patent: Nov. 29, 2016

(54) COMBINATION LED FOG LAMP AND DAYTIME RUNNING LAMP

(71) Applicant: MYOTEK PACIFIC CORP., Laguna Beach, CA (US)

(72) Inventor: Robert T. Harrington, Jr., Laguna Beach, CA (US)

(73) Assignee: MYOTEK PACIFIC CORP., Laguna Beach, CA (US)

( * ) Notice: Subject to any disclaimer, the term of this patent is extended or adjusted under 35 U.S.C. 154(b) by 0 days.

(21) Appl. No.: 14/589,461

(22) Filed: Jan. 5, 2015

(65) Prior Publication Data

US 2015/0117046 A1    Apr. 30, 2015

Related U.S. Application Data

(63) Continuation of application No. 13/957,225, filed on Aug. 1, 2013, now Pat. No. 8,928,226.

(51) Int. Cl.
*B60Q 1/02* (2006.01)
*F21S 8/10* (2006.01)
*B60Q 1/20* (2006.01)

(52) U.S. Cl.
CPC ............ *F21S 48/1747* (2013.01); *B60Q 1/20* (2013.01); *F21S 48/115* (2013.01); *F21S 48/1159* (2013.01); *F21S 48/1388* (2013.01); *F21S 48/1705* (2013.01); *F21S 48/215* (2013.01); *F21S 48/218* (2013.01); *B60Q 2400/30* (2013.01)

(58) Field of Classification Search
None
See application file for complete search history.

(56) References Cited

U.S. PATENT DOCUMENTS 7,401,959 B2    7/2008  Kogo et al.
8,928,226 B1 *  1/2015  Harrington, Jr. ............... 315/82

2010/0053987 A1   3/2010  Nakabayashi
2010/0066249 A1   3/2010  Nagafuchi et al.
2011/0169410 A1   7/2011  Dassanayake et al.
2012/0112614 A1   5/2012  Pickard et al.
2014/0063832 A1   3/2014  Lin

FOREIGN PATENT DOCUMENTS

EP    2187115 A2     5/2010
GB    191102776 A   10/1911

OTHER PUBLICATIONS

International Search Report and Written Opinion for International Application No. PCT/US2014/049010, dated Mar. 11, 2015, 9 pages.

* cited by examiner

*Primary Examiner* — Anh Tran
(74) *Attorney, Agent, or Firm* — Barnes & Thornburg LLP

(57) ABSTRACT

A combination lamp for use in a vehicle includes a number of reflector modules, with each reflector module including a reflector, a first light emitting diode ("LED") positioned at a focus of the reflector, and a second LED offset from the focus of the reflector. The lamp may also include another reflector module having a reflector and a single, common LED positioned at a focus of the reflector. When the first LEDs and the common LED are energized, the combination lamp produces a first light pattern. When the second LEDs and the common LED are energized, the combination lamp produces a second light pattern. The first light pattern may be a fog lamp light pattern, and the second light pattern may be a daytime running lamp light pattern. The combination lamp may include four, five, or more reflector modules, including the one reflector module having the single, common LED.

18 Claims, 6 Drawing Sheets

COMBINATION LED FOG LAMP AND DAYTIME RUNNING LAMP

This application is a continuation of U.S. Utility patent application Ser. No. 13/957,225, now U.S. Pat. No. 8,928, 226, entitled "COMBINATION LED FOG LAMP AND DAYTIME RUNNING LAMP," by Robert T. Harrington, Jr., which was filed on Aug. 1, 2013 and is expressly incorporated herein by reference.

TECHNICAL FIELD

The present disclosure relates generally to lamps for vehicles and, more particularly, to a vehicular fog lamp and daytime running lamp.

BACKGROUND

Cars and trucks include lamps to provide illumination, including headlamps, fog lamps, and daytime running lamps. Fog lamps are auxiliary lighting devices typically mounted low in the front fascia of a vehicle. Fog lamps direct light low and toward the ground to provide improved visibility during poor weather conditions. Fog lamps typically do not direct substantial amounts of light above a horizontal plane, to help prevent glare that may dazzle oncoming drivers. Typical "projector" fog lamps include a halogen light bulb surrounded by a polyellipsoidal reflector, which is covered by a glass aspheric condensing lens. When packaged into the vehicle, the bulb, reflector, and lens assembly of a projector fog lamp may extend relatively deep into the vehicle's front fascia.

Daytime running lamps (DRL), also called daytime running lights, are forward lighting devices that are intended to increase the visibility of a vehicle when its main headlamps are not be activated, such as during the day or in mixed lighting conditions. DRLs typically direct light forward, and a substantial amount of light may be directed above the horizon. As compared to light produced by fog lamps, directing light forward and above the horizon may cause additional light to reach the eyes of oncoming drivers, increasing the visibility of the DRL. Because DRLs are typically used in conditions with relatively bright ambient light, DRLs may not dazzle oncoming drivers. DRLs may produce light of similar intensity to low-beam headlamps or may produce light of lower intensity. Typical DRLs may be implemented using dedicated lamps, or by running incandescent headlamps with reduced voltage.

Light-emitting diode (LED) light sources provide an efficient light source. LEDs for automotive applications typically consume about 12 watts of electrical power in operation. LEDs also generally have much longer expected lifetimes than halogen or other incandescent light bulbs. However, LEDs differ from halogen light bulbs in several characteristics. LEDs typically produce lower amounts of luminous flux. Additionally, the longevity and light production of LEDs are both sensitive to operating temperature, requiring thermal management.

SUMMARY

According to one aspect of the disclosure, an automotive lamp is disclosed. The automotive lamp includes a plurality of reflectors, a first plurality of light emitting diodes (LEDs) including a first LED positioned at a focus of a first reflector of the plurality of reflectors and operable to direct light at the first reflector, and a second plurality of LEDs including a second LED offset from the focus of the first reflector and operable to direct light at the first reflector. The automotive lamp is configured to produce a first light pattern when the first plurality of LEDs are energized, and produce a second light pattern when the second plurality of LEDs are energized.

In some embodiments, the automotive lamp may include a third LED positioned at the focus of a second reflector of the plurality of reflectors and operable to direct light at the second reflector, and an electronic controller. The electronic controller may be configured to energize the first plurality of LEDs and the third LED to produce the first light pattern and energize the second plurality of LEDs and the third LED to produce the second light pattern.

In some embodiments, the first plurality of LEDs may further include a fourth LED positioned at a focus of a third reflector and operable to direct light at the third reflector, the second plurality of LEDs may further include a fifth LED offset from the focus of the third reflector and operable to direct light at the third reflector, and the second reflector may be positioned between the first reflector and the third reflector.

In some embodiments, the plurality of reflectors may include four reflectors. The first plurality of LEDs may include four LEDs, each LED being operable to direct light at one of the four reflectors and being positioned at a focus of the one reflector, and the second plurality of LEDs may include four LEDs, each LED being operable to direct light at one of the four reflectors and being positioned offset from the focus of the one reflector.

In some embodiments, when the first light pattern is viewed in an imaginary reference plane positioned a predefined distance in front of the automotive lamp, a first vertical distance may be defined between an upper end and a lower end of the first light pattern. When the second light pattern is viewed in the reference plane, a second vertical distance may be defined between an upper end and a lower end of the second light pattern, the second vertical distance being greater than the first vertical distance. In some embodiments, the first light pattern may be a fog lamp light pattern, and the second light pattern may be a daytime running lamp light pattern. In some embodiments, the upper end of the first light pattern may be positioned below an imaginary line in the reference plane that corresponds to the horizon, and the upper end of the second light pattern may be positioned above the imaginary line. In some embodiments, a first horizontal distance may be defined between a left end and a right end of the first light pattern, and a second horizontal distance may be defined between a left end and a right end of the second light pattern, the second horizontal distance being less than the first horizontal distance.

In some embodiments, the electronic controller may be further configured to de-energize the first plurality of LEDs when the second plurality of LEDs are energized and de-energize the second plurality of LEDs when the first plurality of LEDs are energized.

According to another aspect, an automotive lamp includes a lamp housing for installation in a vehicle, the lamp housing having an inboard side and an outboard side, wherein the vehicle defines a longitudinal vehicle axis, and a plurality of reflector modules arranged linearly within the lamp housing. Each reflector module includes a support coupled to the lamp housing, a reflector extending from the support and defining a focus on a surface of the support, and a first light emitting diode (LED) positioned on the surface of the support at the focus of the reflector and operable to direct light at the reflector. Each reflector module produces a first light pattern when the first LED is energized. Each of a first reflector module and a second reflector module of the plurality of reflector modules includes a second LED positioned on the surface of the support offset from the focus of the reflector, the second LED being operable to direct light at the reflector. Each of the first reflector module and the second reflector module produces a second light pattern when the second LED is energized.

In some embodiments, when each first light pattern produced by the plurality of reflector modules is viewed in an imaginary reference plane positioned a predefined distance along the vehicle axis in front of the automotive lamp, an upper end of each first light pattern may be positioned below an imaginary line in the reference plane that corresponds to the horizon, and when each second light pattern produced by the plurality of reflector modules is viewed in the reference plane, a centroid of each second light pattern may be offset vertically from a centroid of the first light pattern produced by the same reflector.

In some embodiments, the plurality of reflector modules may further include a third reflector module positioned between the first reflector module and the second reflector module. The automotive lamp may further include an electronic controller configured to energize the first LED of the third reflector module when the first LEDs of the first reflector module and the second reflector module are energized and energize the first LED of the third reflector module when the second LEDs of the first reflector module and the second reflector module are energized.

In some embodiments, the plurality of reflector modules may further include a fourth reflector module, the fourth reflector module including a second LED positioned on the surface of the support offset from the focus of the reflector, the second LED being operable to direct light at the reflector, and producing a second light pattern when the second LED is energized. The first reflector module may be positioned inboard of the third reflector module, the second reflector module may be positioned outboard of the third reflector module, and the fourth reflector module may be positioned outboard of the second reflector module.

In some embodiments, the plurality of reflector modules may further include a fourth reflector module, the fourth reflector module including a second LED positioned on the surface of the support offset from the focus of the reflector, the second LED being operable to direct light at the reflector, and producing a second light pattern when the second LED is energized. The first reflector module may be positioned inboard of the third reflector module, the second reflector module may be positioned outboard of the third reflector module, and the fourth reflector module may be positioned inboard of the first reflector module. In some embodiments, the plurality of the reflector modules may further include a fifth reflector module, the fifth reflector module including a second LED positioned on the surface of the support offset from the focus of the reflector, the second LED being operable to direct light at the reflector, producing a second light pattern when the second LED is energized, and being positioned outboard of the second reflector module.

In some embodiments, the second LEDs of the first reflector module and the fourth reflector module may be positioned closer to the reflector than the focus, and the second LEDs of the second reflector module and fifth reflector module may be positioned further from reflector than the focus. In some embodiments, when each second light pattern produced by the first reflector module and the fourth reflector module is viewed in an imaginary reference plane positioned a predefined distance along the vehicle axis in front of the automotive lamp, the second light pattern may have a centroid positioned vertically above a centroid of the first light pattern produced by the same reflector module, and when each second light pattern produced by the second reflector module and the fifth reflector module is viewed in the reference plane, the second light pattern may have a centroid positioned vertically below a centroid of each first light pattern produced by the same reflector module.

In some embodiments, the reflectors of the plurality of reflector modules may be configured to reflect the light produced by the first LEDs and the second LEDs out of the lamp housing without obstruction.

According to another aspect, a method for automotive lighting includes energizing a plurality of first light emitting diodes (LEDs) to produce a first light pattern, wherein each first LED is positioned at a focus of a reflector of a plurality of reflectors, energizing a plurality of second LEDs to produce a second light pattern, wherein each second LED is offset from the focus of a reflector corresponding to a first LED, and energizing a third LED positioned at a focus of a reflector of the plurality of reflectors when the plurality of first LEDs are energized to produce the first light pattern and when the plurality of second LEDs are energized to produce the second light pattern.

In some embodiments, energizing the plurality of first LEDs and the third LED may include energizing the plurality of first LEDs and the third LED to produce the first light pattern that, when viewed in an imaginary reference plane positioned a predefined distance in front of the plurality of reflectors, has an upper end positioned below an imaginary line in the reference plane that corresponds to the horizon. Energizing the plurality of second LEDs and the third LED may include energizing the plurality of second LEDs and the third LED to produce the second light pattern that, when viewed in the reference plane, (i) has an upper end positioned above the upper end of the first light pattern and (ii) has a lower end positioned below a lower end of the first light pattern.

BRIEF DESCRIPTION OF THE DRAWINGS

The detailed description particularly refers to the following figures, in which.

DETAILED DESCRIPTION OF THE DRAWINGS

Figure 1:
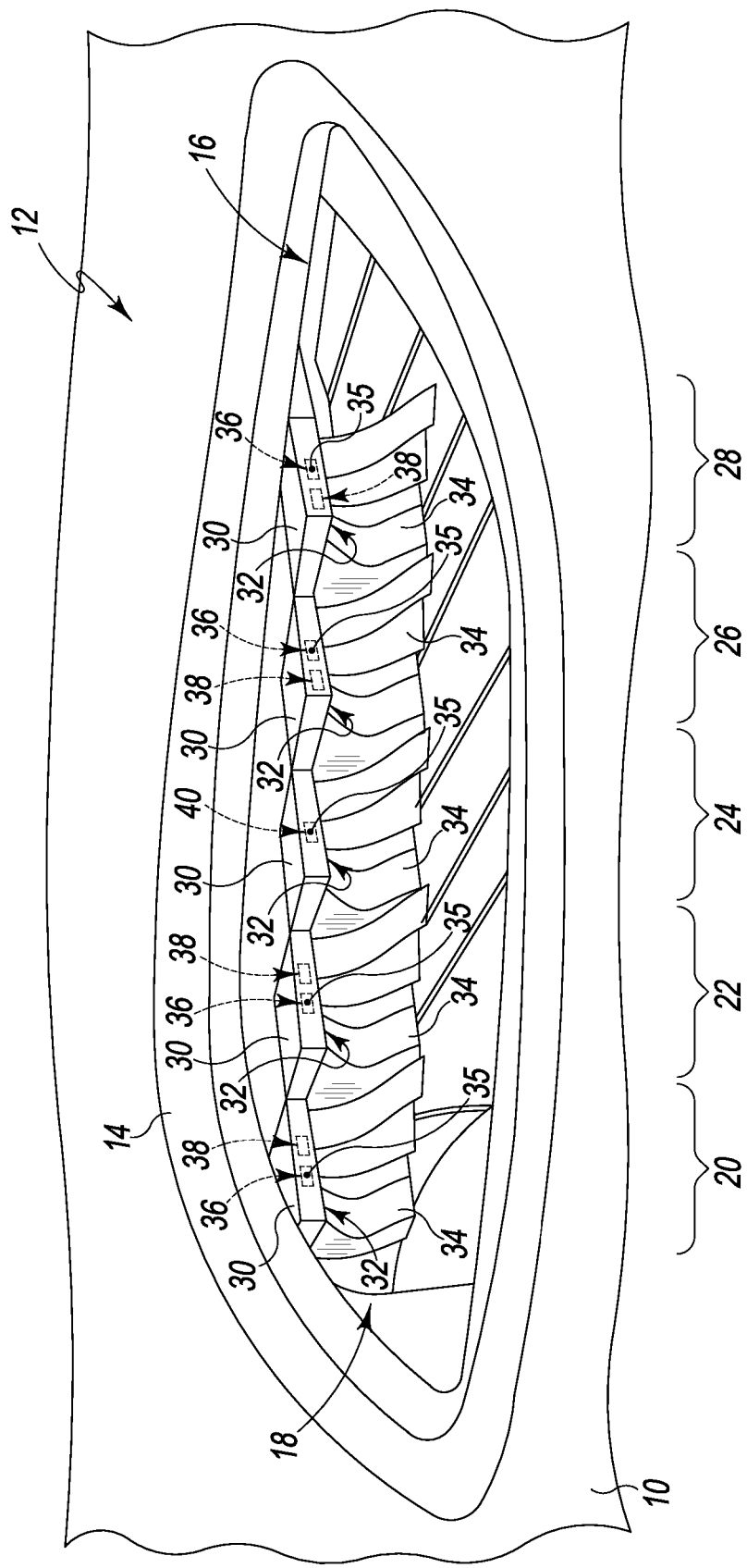
FIG. 1 is a perspective view of a combination lamp.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Referring now to FIG. 1, a portion of the front fascia of a vehicle 10 is shown. The illustrative vehicle 10 is a passenger car; however in other embodiments the vehicle 10 may be a car, truck, sport utility vehicle, or any other road-going passenger vehicle. The vehicle 10 includes a combination lamp 12 installed in the front fascia. The combination lamp 12 performs multiple lighting functions for the vehicle 10. For example, the illustrative combination lamp 12 performs both fog lamp and daytime running lamp (DRL) functions. In other embodiments, the combination lamp 12 may perform additional or alternative functions, such as low beam headlamp, high beam headlamp, driving light, turning light, or any other vehicular lighting function. The combination lamp 12 includes a housing 14 that covers and protects the internal components of the combination lamp 12 from water, road grime, and other debris. Additionally, the housing 14 includes mounting hardware, such as mounting clips or threaded holes for receiving screws or bolts to support attachment to the vehicle. The housing 14 may be constructed from any suitably durable material, including a plastic material such as acrylonitrile butadiene styrene ("ABS") plastic or a metallic material such as aluminum.

The combination lamp 12 includes a lens 16 positioned at the front of the housing 14. The lens 16 is transparent and further serves to seal and protect the internal components of the combination lamp 12. In the illustrative embodiment, the lens 16 is "non-optical"—that is, the lens 16 does not substantially refract light passing through the lens. The lens 16 is constructed from polycarbonate plastic that has a substantially constant cross-sectional thickness throughout. In other embodiments, the lens 16 may be constructed of other transparent or semi-transparent material, such as glass.

The combination lamp 12 includes a number of reflector modules 18 positioned inside the combination lamp 12. The illustrative combination lamp 12 includes five reflector modules 20, 22, 24, 26, 28. In other embodiments, the combination lamp 12 may omit one of the end reflector modules 20, 28, thereby including four reflector modules 18. In still other embodiments, the combination lamp 12 may include more than five reflector modules 18. The reflector modules 18 are arranged one next to the other. In the illustrative combination lamp 12, the reflector modules 18 are staggered diagonally. Of the reflector modules 18, the reflector module 20 is positioned furthest from the center line of the vehicle 10; in other words, the reflector module 20 is located in the furthest outboard position and closest to the back of the vehicle 10. The reflector module 22 is positioned closer to the center line of the vehicle 10 and in front of the reflector module 20, the reflector module 24 is positioned closer to the center line of the vehicle 10 and in front of the reflector module 22, and so on. The reflector module 28 is positioned furthest inboard, that is, closest to the center line of the vehicle 10 and closest to the front of the vehicle 10. The illustrated combination lamp 12 is configured for installation on the right-hand side of the vehicle 10; the arrangement of the reflector modules 18 may be mirrored for installation on the left-hand side of the vehicle 10. It should be appreciated that while the illustrated reflector modules 18 are separate components, in other embodiments one or more of the reflector modules 18 may be combined into or manufactured as a single unit.

Each of the reflector modules 18 includes a support bracket 30 that is attached to the housing 14. The support bracket 30 also includes electrical connections to connect the combination lamp 12 to the electrical system of the vehicle 10. The support bracket 30 includes a bottom surface 32 that supports attachment of electrical components such as LEDs. The bottom surface 32 is not reflective. The support bracket 30 may additionally include a thermal management system to dissipate waste heat generated by the combination lamp 12 in operation, such as a heat sink or a thermal coupling to a separate heat sink.

Each of the reflector modules 18 includes a reflector 34 attached to the support bracket 30 and extending downwardly therefrom. Each reflector 34 is configured to reflect light produced in the combination lamp 12 through the lens 16, as further described below. Each reflector 34 defines an optical focus 35 at a point on the bottom surface 32 of the support bracket 30 (see also FIG. 3). As illustrated, each reflector 34 is composed of multiple facets, with each of the facets sharing the same focus. Each reflector 34 is formed as a separate piece of aluminum-coated ABS plastic. In other embodiments, the reflectors 34 may be made of other reflective materials.

Figure 3:
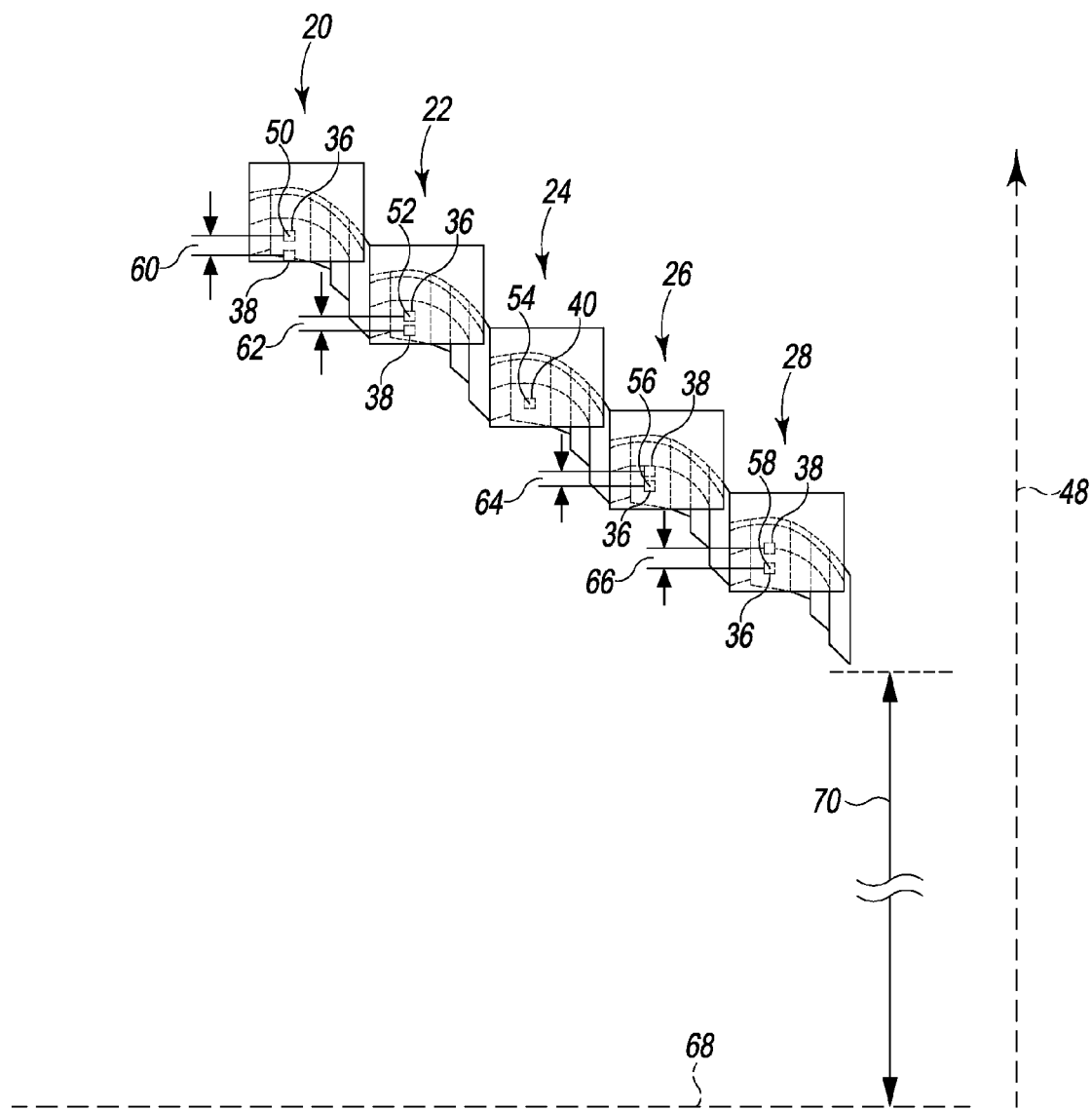
FIG. 3 is an overhead schematic diagram of one aspect of the interior components of the combination lamp of FIGS. 1 and 2.

The reflector modules 20, 22, 26, 28 each include a fog lamp LED 36 and a DRL LED 38 positioned on the bottom surface 32 of the support bracket 30. As shown in FIG. 3, the fog lamp LED 36 is positioned on the bottom surface 32 at the focus 35 of the corresponding reflector 34, and the DRL LED 38 is offset from the focus 35 of the corresponding reflector 34. When energized, each of the LEDs 36, 38 is oriented to direct light at the corresponding reflector 34, which reflects the light out of the combination lamp 12 through the lens 16. As described further below, each of the LEDs 36, 38 produces a different light pattern when energized and thus performs a different automotive lighting function. In the illustrative combination lamp 12, the fog lamp LED 36 produces a fog lamp light pattern 76 (see FIGS. 4-5), and the DRL LED 38 produces a DRL light pattern 92 (see FIGS. 4-5). As described above, in other embodiments the reflector modules 18 may produce different light patterns, such as a low-beam light pattern and a high-beam light pattern, by including additional LEDs or LEDs having different configurations.

In the illustrative embodiment, one reflector module 24 is positioned between the reflectors modules 22, 26. However, in other embodiments, for example in embodiments with an even number of reflector modules 18, the reflector module 24 may be at any position within the reflector modules 18 between two other reflector modules 18. The reflector module 24 includes a single common LED 40 positioned on the bottom surface 32 of the support bracket 30. The common LED 40 is positioned at the focus of the corresponding reflector 34. When energized, the common LED 40 directs light at the corresponding reflector 34, which reflects the light out of the combination lamp 12 through the lens 16. Thus, the common LED 40 is arranged similarly to the fog lamp LEDs 36 of the other reflector modules 20, 22, 26, 28.

However, the combination lamp 12 is configured to energize the common LED 40 when the fog lamp LEDs 36 of the other reflector modules 20, 22, 26, 28 are energized and to energize the common LED 40 when the DRL LEDs 38 of the other reflector modules 20, 22, 26, 28 are energized. Thus, the common LED 40 contributes light to both light patterns 76, 92 produced by the combination lamp 12.

The LEDs 36, 38, 40 may be connected to the electrical system of the vehicle 10 (e.g., 12 volts DC power) through a printed circuit board or using a pair of wires (not shown). Each LED 36, 38, 40 may include a single LED chip or multiple LED chips integrated in a single physical package. Each LED 36, 38, 40 produces white light having the same color temperature. In some embodiments, each LED 36, 38, 40 may also produce the same amount of luminous flux, and indeed may be embodied as the same LED. For example, each LED 36, 38, 40 may be embodied as a cool-white LED using a 350 mA drive current. In other embodiments, the fog lamp LEDs 36 may produce a different amount of luminous flux from the DRL LEDs 38.

Figure 2:
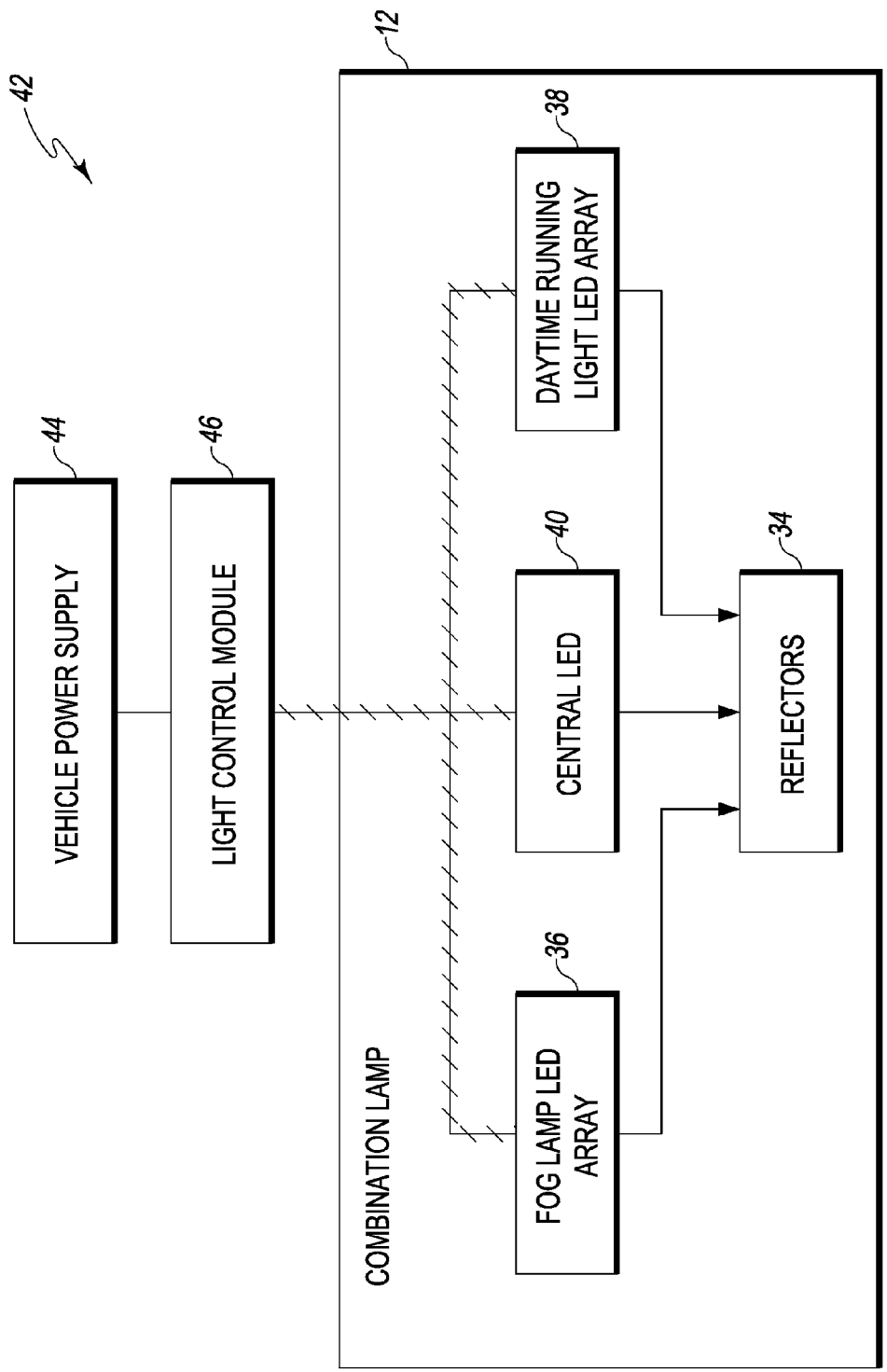
FIG. 2 is a simplified block diagram of the combination lamp of FIG. 1.

Referring now to FIG. 2, a simplified block diagram 42 illustrates the combination lamp 12 of the vehicle 10. As described above, the vehicle power supply 44 is a standard vehicle electrical system supplying about 12 volts DC power, for example from a battery or an alternator. The vehicle power supply 44 is coupled to a light control module 46 that controls and regulates operation of the combination lamp 12. The light control module 46 includes an electronic controller that activates the various functions of the combination lamp 12 as required. The light control module 46 receives and interprets input from user controls and sensors in the vehicle 10 to determine which function should be activated. For example, the light control module 46 may activate the DRL function when a sensor (not shown) detects that the vehicle 10 is in daylight and may activate the fog lamp function in response to a user-controlled switch in the cabin of the vehicle 10. Although illustrated as a separate functional block, in some embodiments some or all of the functionality of the light control module 46 may be integrated with the combination lamp 12.

To activate the functions of the combination lamp 12, the light control module 46 is operatively coupled to the fog lamp LEDs 36, the DRL LEDs 38, and the common LED 40. In general, to activate the fog lamp function, the light control module 46 energizes the fog lamp LEDs 36 and the common LED 40, and to activate the DRL function, the light control module 46 energizes the DRL LEDs 38 and the common LED 40. When the fog lamp function is activated the light control module 46 may energize the fog lamp LEDs 36 and de-energize the DRL LEDs 38. Conversely, when the DRL function is activated, the light control module 46 may energize the DRL LEDs 38 and de-energize the fog lamp LEDs 36. In some embodiments, the light control module 46 may activate both the fog lamp function and the DRL function by energizing all of the LEDs 36, 38, 40 and may deactivate both the fog lamp function and the DRL function by de-energizing all of the LEDs 36, 38, 40. Thus, each of the fog lamp LEDs 36 and the DRL LEDs 38 may be considered to be a separate LED array. When energized, each of the LEDs 36, 38, 40 emits light directed at the reflectors 34, which reflect the light out of the combination lamp 12.

Referring now to FIG. 3, an overhead schematic diagram of the combination lamp 12 is shown. Vehicle axis 48 corresponds to the longitudinal axis of the vehicle 10. Each of the reflector modules 18 includes a focus 50, 52, 54, 56, 58 defined by the corresponding reflector 34 and positioned on the bottom surface 32 of the support bracket 30.

As described above, the outboard reflector module 20 includes a fog lamp LED 36 positioned at the focus 50 and a DRL LED 38 offset in front of the focus 50 along the vehicle axis 48 by an offset amount 60. The reflector module 22 includes a fog lamp LED 36 positioned at the focus 52 and a DRL LED 38 offset in front of the focus 52 along the vehicle axis 48 by an offset amount 62. As described above, the reflector module 24 includes the common LED 40 positioned at the focus 54. Reflector module 24 does not include a second LED. The reflector module 26 includes a fog lamp LED 36 positioned at the focus 56 and a DRL LED 38 offset behind the focus 56 along the vehicle axis 48 by an offset amount 64. The inboard reflector module 28 includes a fog lamp LED 36 positioned at the focus 58 and a DRL LED 38 offset behind the focus 58 along the vehicle axis 48, by an offset amount 66.

In some embodiments, the offset amounts 60, 66 of the reflector modules 20, 28, respectively, may be equal in magnitude, and the offset amounts 62, 64 of the reflector modules 22, 26, respectively, may be equal in magnitude. Further, in some embodiments, the offset amounts 60, 66 may be larger in magnitude than the offset amounts 62, 64. For example, the offset amounts 60, 66 may be equal to 3.09 millimeters, and the offset amounts 62, 64 may be equal to 1.55 millimeters.

An imaginary reference plane 68 may be established a distance 70 in front of the combination lamp 12. The reference plane 68 is perpendicular to the vehicle axis 48 and may be used to view and/or measure the light patterns produced by the combination lamp 12. The distance 70 may be any distance large enough to allow the light patterns produced by the combination lamp 12 to stabilize. The distance 70 may be sixty feet when performing standardized testing, for example testing according to the SAE International standards J583 or J2087. In other embodiments, the distance 70 may be about fifteen feet or more.

Figure 4:
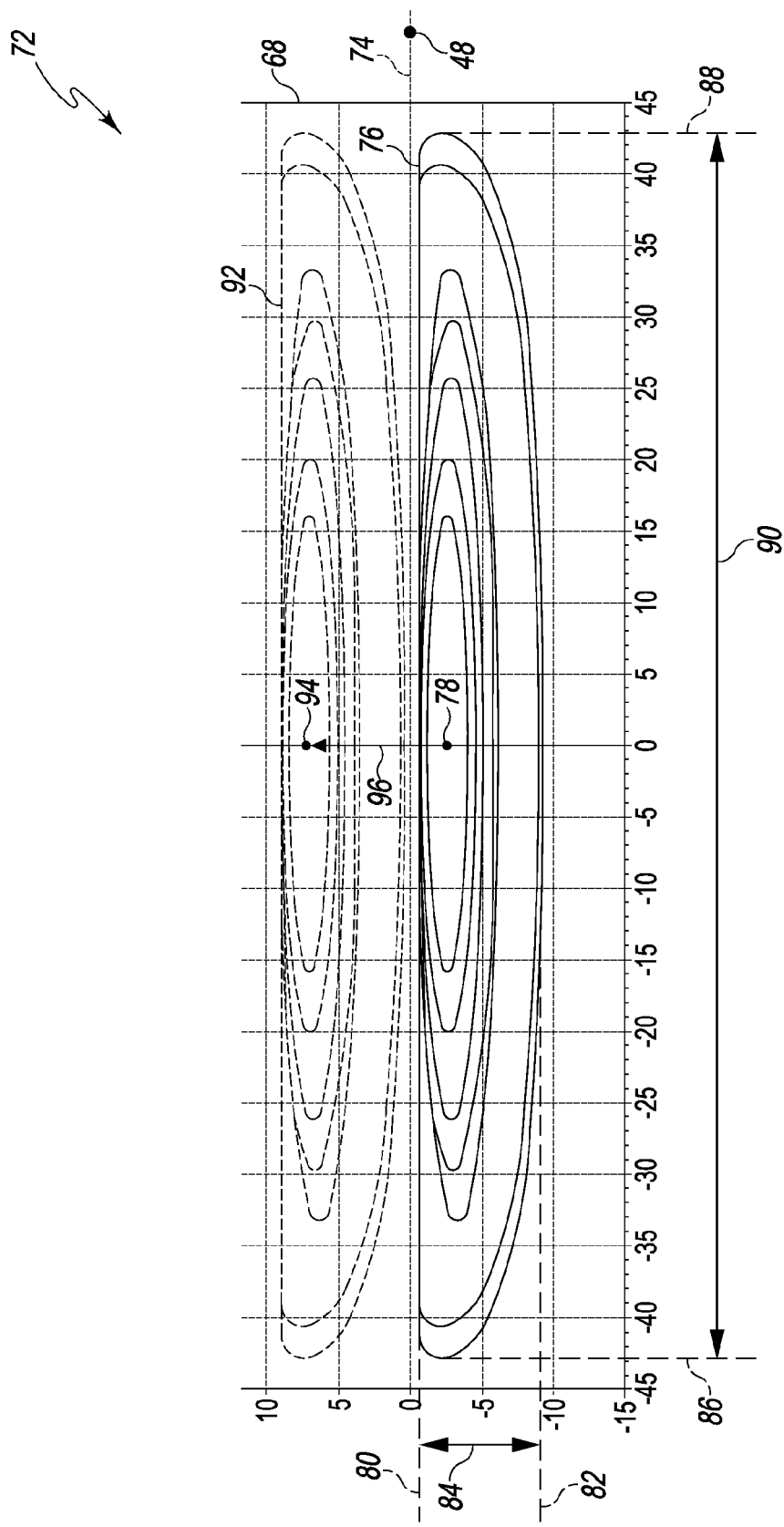
FIG. 4 is a schematic diagram of one embodiment of a fog lamp light pattern produced by the combination lamp of FIGS. 1 and 2.
Figure 5:
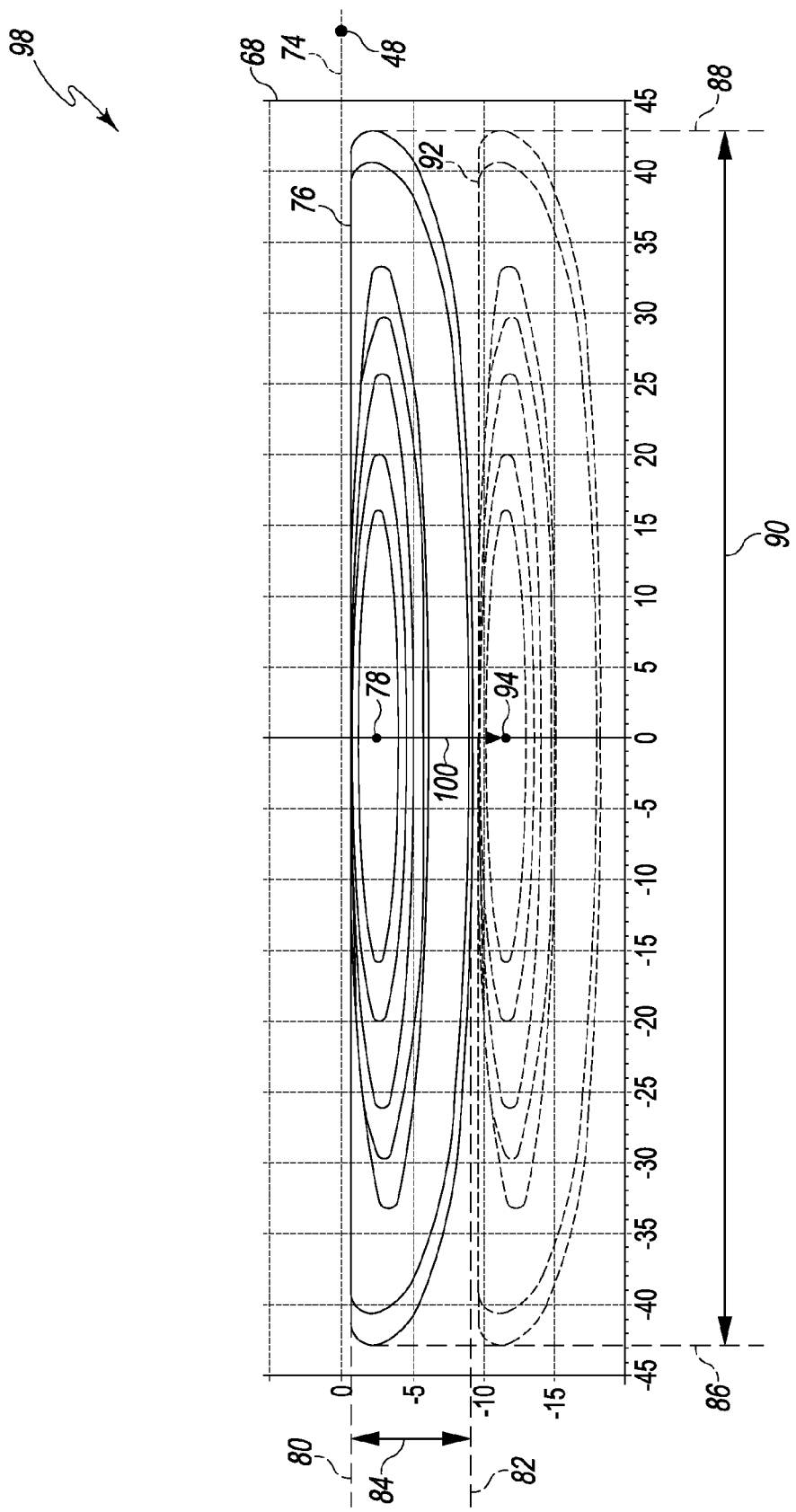
FIG. 5 is a schematic diagram of another embodiment of a fog lamp light pattern produced by the combination lamp of FIGS. 1 and 2.

Referring now to FIGS. 4 and 5, schematic diagrams 72, 98 illustrate light produced by the reflector modules 18 when viewed in the reference plane 68. The reference plane 68 includes an imaginary line 74 that is positioned to be level with the combination lamp 12; that is, at an angle of zero degrees up or down with respect to the vehicle axis 48. Thus, when the vehicle 10 is on a level surface the line 74 coincides with the horizon. Light pattern 76 illustrates a fog lamp light pattern produced by one of the reflector modules 18 when the corresponding fog lamp LED 36 is energized. The fog lamp light pattern 76 is also representative of the light pattern produced by the reflector module 24 when the common LED 40 is energized. Contour lines of the fog lamp light pattern 76 correspond to levels of intensity of light received at the reference plane 68. The fog lamp light pattern 76 includes a centroid 78. The centroid 78 is the geometric center of the fog lamp light pattern 76, and may correspond to the center of intensity (the "hot spot") of the fog lamp light pattern 76. In the illustrative embodiment, the fog lamp light patterns 76 produced by all of the reflector modules 18 are coextensive; therefore, the fog lamp light pattern 76 also represents the combined light pattern produced by the combination lamp 12 when the fog lamp LEDs 36 and the common LED 40 are energized. In other embodiments, the fog lamp light patterns 76 produced by the reflector modules 18 may be vertically coextensive but spread apart horizontally.

The fog lamp light pattern 76 extends from a top end 80 to a bottom end 82, and a vertical distance 84 is defined between the top end 80 and the bottom end 82. The top end 80 may be positioned below the line 74, for example, about three degrees below the line 74. The bottom end 82 may be positioned about ten degrees below the line 74. By being positioned below the line 74 and therefore typically being directed below the horizon, the fog lamp light pattern 76 tends to avoid directing light toward the eyes of oncoming drivers and therefore may be desirable for the fog lamp function. The light pattern 76 also extends from a left end 86 to a right end 88, and a horizontal distance 90 is defined between the left end 86 and the right end 88. The left end 86 may be positioned at about forty degrees left of center, and the right end 88 may be positioned at about forty degrees right of center.

Light pattern 92 illustrates a DRL light pattern produced by one of the reflector modules 18 when the corresponding DRL LED 38 is energized. The DRL light pattern 92 includes a centroid 94. The centroid 94 has been displaced vertically with respect to the centroid 78 of the fog lamp light pattern 76. As illustrated in FIG. 4, the centroid 94 has been displaced vertically upward by a distance 96, and as illustrated in FIG. 5 the centroid 94 has been displaced vertically downward by a distance 100. As illustrated in FIG. 4, the DRL light pattern 92 may extend above the line 74 and thus may direct light upward, above the horizon. Because daytime running lamps are used to alert oncoming drivers of the presence of the vehicle 10, directing light upward toward the eyes of oncoming drivers may be desirable for the DRL function.

Figure 6:
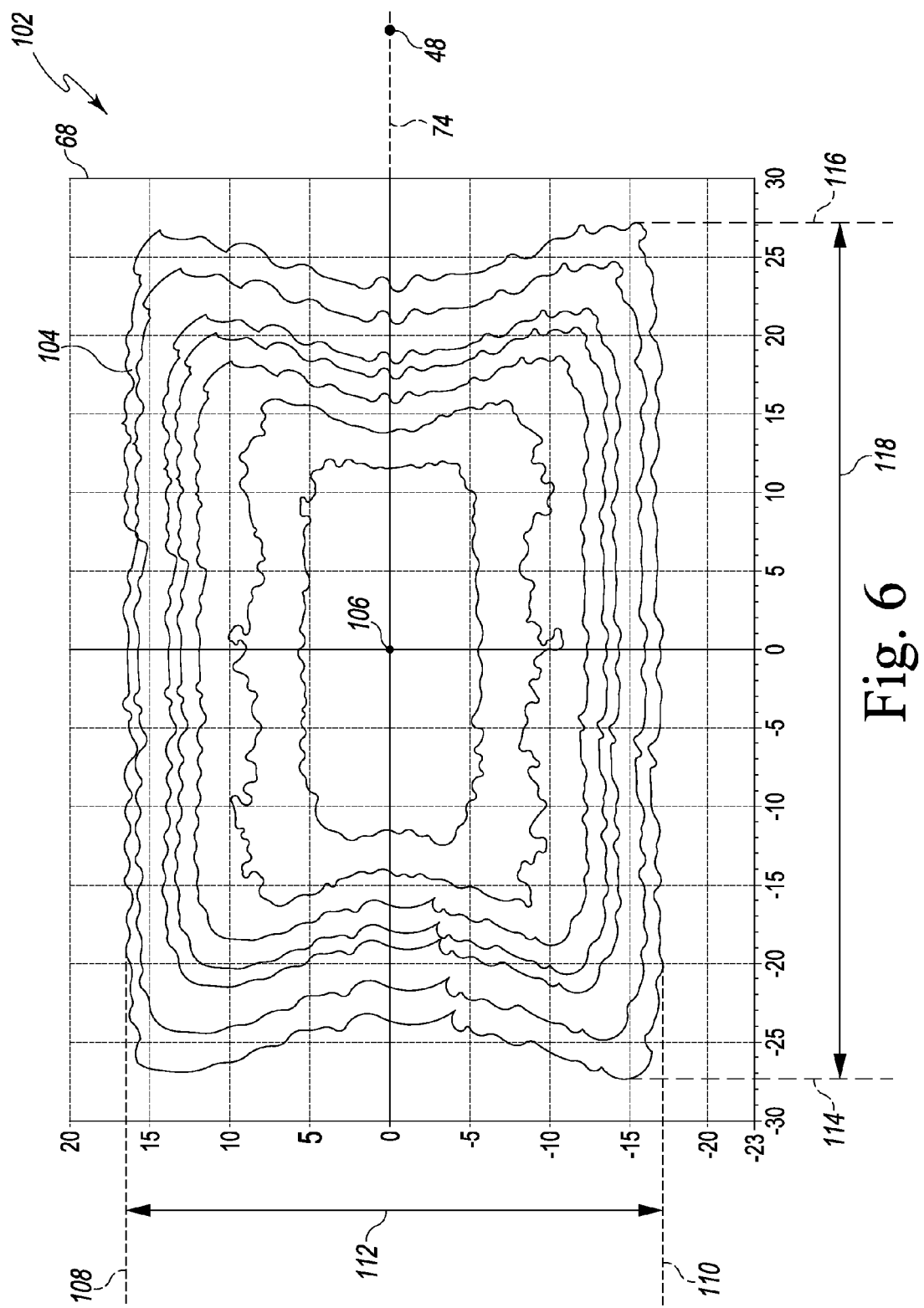
FIG. 6 is a schematic diagram of one embodiment of a DRL light pattern produced by the combination lamp of FIGS. 1 and 2.

Referring now to FIG. 6, schematic diagram 102 illustrates light produced by the combination lamp 12 viewed in the reference plane 68. Light pattern 104 illustrates a DRL light pattern produced by the combination lamp 12; that is, light pattern 104 illustrates the combined light patterns 92 of all of the reflector modules 18 when the DRL LEDs 38 and the common LED 40 are energized. The combined light pattern 104 includes a centroid 106 positioned on the line 74 at zero degrees left or right of center. The light pattern 104 extends from a top end 108 to a bottom end 110, and a vertical distance 112 is defined between the top end 108 and the bottom end 110. The vertical distance 112 may be greater than the vertical distance 84 of the fog lamp light pattern 76; that is, the combined light pattern 104 may be larger vertically than the fog lamp light pattern 76. The top end 108 is positioned above the line 74, for example, about fifteen degrees above the line 74. The bottom end 110 is positioned below the line 74, for example, about fifteen degrees below the line 74. By being extending above the line 74, the combined light pattern 104 may be suitable for use as a DRL light pattern, as described above. The combined light pattern 104 also extends from a left end 114 to a right end 116, and a horizontal distance 118 is defined between the left end 114 and the right end 116. The horizontal distance 118 may be less than the horizontal distance 90 of the fog lamp light pattern 76; that is, the combined light pattern 104 may be more narrow horizontally than the fog lamp light pattern 76. For example, the left end 114 may be positioned at about twenty-five degrees left of center, and the right end 116 may be positioned at about twenty-five degrees right of center. Because the light patterns 92 of the reflector modules 18 are not coextensive, the combined light pattern 104 may have a lower maximum light intensity than the combined fog lamp light patterns 76 of the reflector modules 18. In other words, the combined light patterns 92 have less overlap than the combined fog lamp light patterns 76 and thus may produce a lower maximum light intensity for the same amount of luminous flux.

Other embodiments of the combination lamp 12 may produce different light patterns. For example, the combination lamp 12 may produce a low-beam headlamp light pattern 76 and high-beam headlamp light patterns 92, 104. The relative sizes of the light patterns may also differ in other embodiments. For example, the horizontal distance 118 of the combined light pattern 104 may be the same as the horizontal distance of the light pattern 76.

There are a plurality of advantages of the present disclosure arising from the various features of the apparatus and system described herein. It will be noted that alternative embodiments of the apparatus and system of the present disclosure may not include all of the features described yet still benefit from at least some of the advantages of such features. Those of ordinary skill in the art may readily devise their own implementations of the apparatus and system that incorporate one or more of the features of the present invention and fall within the spirit and scope of the present disclosure.

The invention claimed is:

1. An automotive lamp comprising:
a plurality of reflectors,
a first plurality of light emitting diodes (LEDs) including a first LED positioned at a focus of a first reflector of the plurality of reflectors and operable to direct light at the first reflector, and
a second plurality of LEDs including a second LED offset from the focus of the first reflector and operable to direct light at the first reflector,
wherein the automotive lamp is configured to (i) produce a first light pattern when the first plurality of LEDs are energized, and (ii) produce a second light pattern when the second plurality of LEDs are energized, and
wherein the first light pattern is a fog lamp light pattern, and the second light pattern is a daytime running lamp light pattern.

2. The automotive lamp of claim 1, further comprising:
a third LED positioned at the focus of a second reflector of the plurality of reflectors and operable to direct light at the second reflector, and
an electronic controller configured to (i) energize the first plurality of LEDs and the third LED to produce the first light pattern and (ii) energize the second plurality of LEDs and the third LED to produce the second light pattern.

3. The automotive lamp of claim 2, wherein:
the first plurality of LEDs further includes a fourth LED positioned at a focus of a third reflector and operable to direct light at the third reflector,
the second plurality of LEDs further includes a fifth LED offset from the focus of the third reflector and operable to direct light at the third reflector, and
the second reflector is positioned between the first reflector and the third reflector.

4. The automotive lamp of claim 1, wherein:
the plurality of reflectors comprises four reflectors,
the first plurality of LEDs comprises four LEDs, each LED being operable to direct light at one of the four reflectors and being positioned at a focus of the one reflector, and
the second plurality of LEDs comprises four LEDs, each LED being operable to direct light at one of the four reflectors and being positioned offset from the focus of the one reflector.

5. The automotive lamp of claim 1, wherein:
when the first light pattern is viewed in an imaginary reference plane positioned a predefined distance in front of the automotive lamp, a first vertical distance is defined between an upper end and a lower end of the first light pattern, and when the second light pattern is viewed in the reference plane, a second vertical distance is defined between an upper end and a lower end of the second light pattern, the second vertical distance being greater than the first vertical distance.

6. The automotive lamp of claim 5, wherein:
the upper end of the first light pattern is positioned below an imaginary line in the reference plane that corresponds to the horizon, and
the upper end of the second light pattern is positioned above the imaginary line.

7. The automotive lamp of claim 5, wherein:
a first horizontal distance is defined between a left end and a right end of the first light pattern, and
a second horizontal distance is defined between a left end and a right end of the second light pattern, the second horizontal distance being less than the first horizontal distance.

8. The automotive lamp of claim 2, wherein the electronic controller is further configured to (i) de-energize the first plurality of LEDs when the second plurality of LEDs are energized and (ii) de-energize the second plurality of LEDs when the first plurality of LEDs are energized.

9. An automotive lamp comprising:
a lamp housing for installation in a vehicle, the lamp housing having an inboard side and an outboard side, wherein the vehicle defines a longitudinal vehicle axis, and
a plurality of reflector modules arranged linearly within the lamp housing, each reflector module including:
a support coupled to the lamp housing,
a reflector extending from the support and defining a focus on a surface of the support, and
a first light emitting diode (LED) positioned on the surface of the support at the focus of the reflector and operable to direct light at the reflector,
wherein each reflector module produces a first light pattern when the first LED is energized, and
wherein each of a first reflector module and a second reflector module of the plurality of reflector modules: (i) includes a second LED positioned on the surface of the support offset from the focus of the reflector, the second LED being operable to direct light at the reflector, and (ii) produces a second light pattern when the second LED is energized, and
wherein the first light pattern is a fog lamp light pattern, and the second light pattern is a daytime running lamp light pattern.

10. The automotive lamp of claim 9, wherein:
when each first light pattern produced by the plurality of reflector modules is viewed in an imaginary reference plane positioned a predefined distance along the vehicle axis in front of the automotive lamp, an upper end of each first light pattern is positioned below an imaginary line in the reference plane that corresponds to the horizon, and
when each second light pattern produced by the plurality of reflector modules is viewed in the reference plane, a centroid of each second light pattern is offset vertically from a centroid of the first light pattern produced by the same reflector.

11. The automotive lamp of claim 9, wherein the plurality of reflector modules further comprises a third reflector module positioned between the first reflector module and the second reflector module,
wherein the automotive lamp further comprises an electronic controller configured to (i) energize the first LED of the third reflector module when the first LEDs of the first reflector module and the second reflector module are energized and (ii) energize the first LED of the third reflector module when the second LEDs of the first reflector module and the second reflector module are energized.

12. The automotive lamp of claim 11, wherein:
the plurality of reflector modules further comprises a fourth reflector module, the fourth reflector module (i) including a second LED positioned on the surface of the support offset from the focus of the reflector, the second LED being operable to direct light at the reflector, and (ii) producing a second light pattern when the second LED is energized,
the first reflector module is positioned inboard of the third reflector module,
the second reflector module is positioned outboard of the third reflector module, and
the fourth reflector module is positioned outboard of the second reflector module.

13. The automotive lamp of claim 11, wherein:
the plurality of reflector modules further comprises a fourth reflector module, the fourth reflector module (i) including a second LED positioned on the surface of the support offset from the focus of the reflector, the second LED being operable to direct light at the reflector, and (ii) producing a second light pattern when the second LED is energized,
the first reflector module is positioned inboard of the third reflector module,
the second reflector module is positioned outboard of the third reflector module, and
the fourth reflector module is positioned inboard of the first reflector module.

14. The automotive lamp of claim 13, wherein the plurality of the reflector modules further comprises a fifth reflector module, the fifth reflector module (i) including a second LED positioned on the surface of the support offset from the focus of the reflector, the second LED being operable to direct light at the reflector, (ii) producing a second light pattern when the second LED is energized, and (iii) being positioned outboard of the second reflector module.

15. The automotive lamp of claim 14, wherein:
the second LEDs of the first reflector module and the fourth reflector module are positioned closer to the reflector than the focus, and
the second LEDs of the second reflector module and fifth reflector module are positioned further from reflector than the focus.

16. The automotive lamp of claim 15, wherein:
when each second light pattern produced by the first reflector module and the fourth reflector module is viewed in an imaginary reference plane positioned a predefined distance along the vehicle axis in front of the automotive lamp, the second light pattern has a centroid positioned vertically above a centroid of the first light pattern produced by the same reflector module, and
when each second light pattern produced by the second reflector module and the fifth reflector module is viewed in the reference plane, the second light pattern has a centroid positioned vertically below a centroid of each first light pattern produced by the same reflector module.

17. The automotive lamp of claim 9, wherein the reflectors of the plurality of reflector modules are configured to reflect the light produced by the first LEDs and the second LEDs out of the lamp housing without obstruction.

18. An automotive lamp comprising:

a lamp housing for installation in a vehicle, the lamp housing having an inboard side and an outboard side, wherein the vehicle defines a longitudinal vehicle axis, and a plurality of reflector modules arranged linearly within the lamp housing, each reflector module including:

a support coupled to the lamp housing, a reflector extending from the support and defining a focus on a surface of the support, and a first light emitting diode (LED) positioned on the surface of the support at the focus of the reflector and operable to direct light at the reflector, an electronic controller configured to selectively energize the first LED, wherein each reflector module produces a first light pattern when the first LED is energized, and wherein each of a first reflector module and a second reflector module of the plurality of reflector modules:
(i) includes a second LED positioned on the surface of the support offset from the focus of the reflector, the second LED being operable to direct light at the reflector, and (ii) produces a second light pattern when the second LED is energized, and wherein the electronic controller is further configured to (i) de-energize the first plurality of LEDs when the second plurality of LEDs are energized and (ii) de-energize the second plurality of LEDs when the first plurality of LEDs are energized.

* * * * *